US009347508B2

(12) United States Patent
Lee et al.

(10) Patent No.: US 9,347,508 B2
(45) Date of Patent: May 24, 2016

(54) ELECTRONIC DISC BRAKE

(71) Applicant: MANDO CORPORATION, Pyeongtaek-si, Gyeonggi-do (KR)

(72) Inventors: Jae-Hyun Lee, Seongnam-si (KR); Young-Hun Kong, Gunpo-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 10 days.

(21) Appl. No.: 14/304,798

(22) Filed: Jun. 13, 2014

(65) Prior Publication Data
US 2015/0053512 A1 Feb. 26, 2015

(30) Foreign Application Priority Data
Aug. 26, 2013 (KR) .................... 10-2013-0100788

(51) Int. Cl.
*F16D 65/38* (2006.01)
*F16D 65/58* (2006.01)
*F16D 65/56* (2006.01)
*F16D 65/60* (2006.01)

(52) U.S. Cl.
CPC .............. *F16D 65/38* (2013.01); *F16D 65/567* (2013.01); *F16D 65/58* (2013.01); *F16D 65/60* (2013.01)

(58) Field of Classification Search
CPC ......... F16D 65/38; F16D 65/58; F16D 65/60; F16D 65/567; F16D 2125/40
USPC .................................................. 188/72.3, 71.9
See application file for complete search history.

(56) References Cited

U.S. PATENT DOCUMENTS

| 4,596,315 A | * | 6/1986 | Takeuchi et al. ............. 188/71.9 |
| 4,784,244 A | * | 11/1988 | Carre et al. .................... 188/156 |
| 4,846,314 A | * | 7/1989 | Nishikawa ................. 188/196 P |
| 6,053,289 A | * | 4/2000 | Bauer et al. ................... 188/71.9 |
| 2004/0112689 A1 | * | 6/2004 | Nakayama et al. .......... 188/71.9 |
| 2011/0155520 A1 | * | 6/2011 | Takahashi et al. ........... 188/72.6 |

FOREIGN PATENT DOCUMENTS

DE 4417741 A1 * 11/1995 ............. F16D 65/18

* cited by examiner

*Primary Examiner* — Xuan Lan Nguyen
(74) *Attorney, Agent, or Firm* — McDermott Will & Emery LLP (57) ABSTRACT

Disclosed is an electronic disc brake. The electronic disc brake includes a caliper housing at which a piston is installed, a carrier coupled with the caliper housing, a pair of pad plates installed at the carrier to be slidable toward a disc, an adjuster to prevent the pad plates from moving away from the disc and maintain the pad plates at a certain distance from the disc, a push rod screw-coupled to the adjuster, a spindle unit coupled to the push rod and installed at a cylinder of the caliper housing, a spring case forming an accommodation space between the cylinder and the push rod, a low-pressure spring and a high-pressure spring arranged in parallel in the spring case, and a support plate slidably installed in the cylinder so that a gap is formed between the low-pressure spring and the high-pressure spring in the longitudinal direction.

7 Claims, 7 Drawing Sheets

Fig. 1

— PRIOR ART —

Fig. 2

-- PRIOR ART --

ELECTRONIC DISC BRAKE

CROSS-REFERENCE TO RELATED APPLICATION

This application claims the benefit of Korean Patent Application No. 2013-0100788, filed on Aug. 26, 2013 in the Korean Intellectual Property Office, the disclosure of which is incorporated herein by reference.

BACKGROUND

1. Field

Embodiments of the present invention relate to an electronic disc brake, and more particularly to, a disc brake which may stably return a piston when braking operation is terminated and improve the effect of return of the piston.

2. Description of the Related Art

In general, a disc brake is a device that is used to slow or stop a vehicle by forcibly pressing friction pads against both sides of a disc rotating together with a wheel of the vehicle to stop rotation of the disc. Recently, an electronic parking brake system configured to electronically control operation of a parking brake is installed to a disc brake to perform a parking brake function.

To reduce brake drag that is caused by continuous contact between the disc and the friction pads after the braking operation, two solutions may be considered for such disc brakes. One solution is to move the piston backward using a sealing member and a roll-back chamfer. The other solution is to move the piston backward by applying a compression spring to pad plates, which are pressed against the disc.

Figure 1:
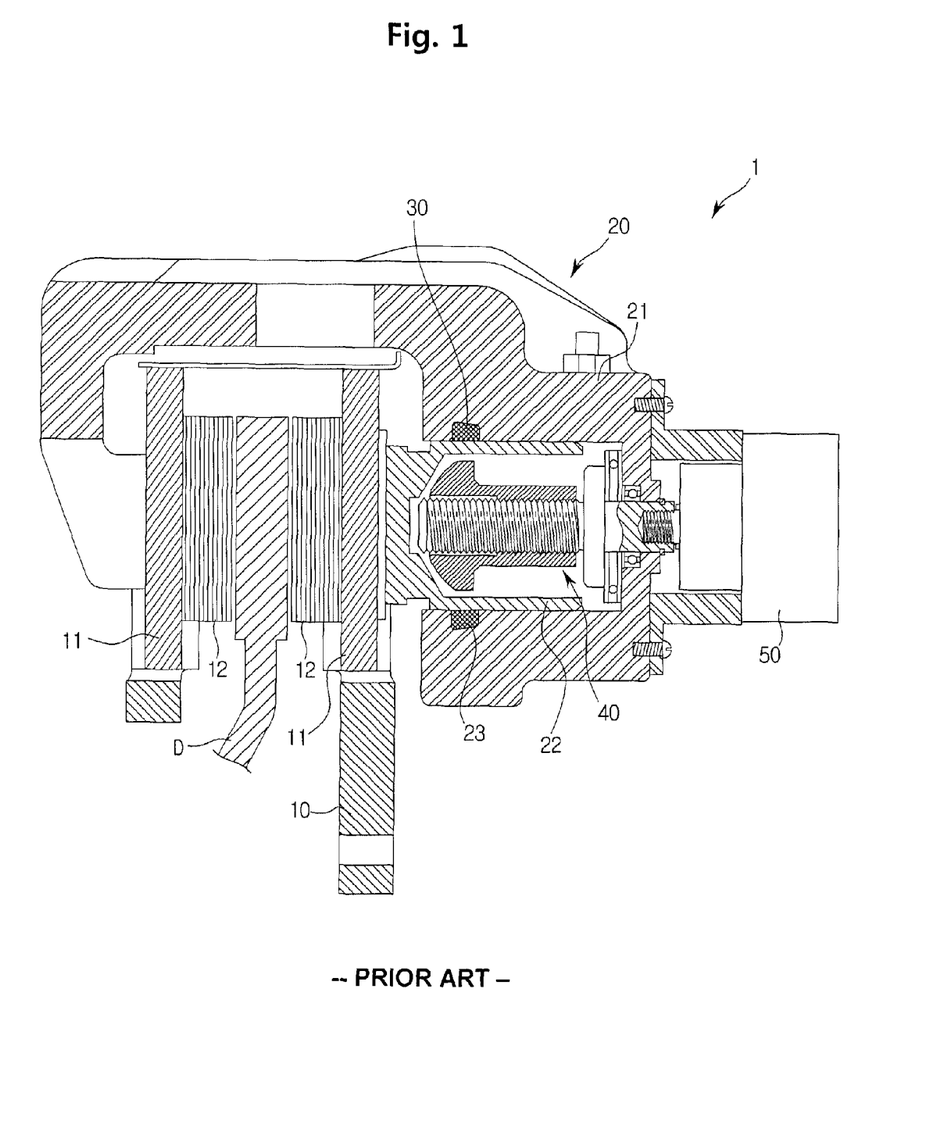
FIG. 1 is a cross-sectional view illustrating a conventional electronic disc brake.
Figure 2:
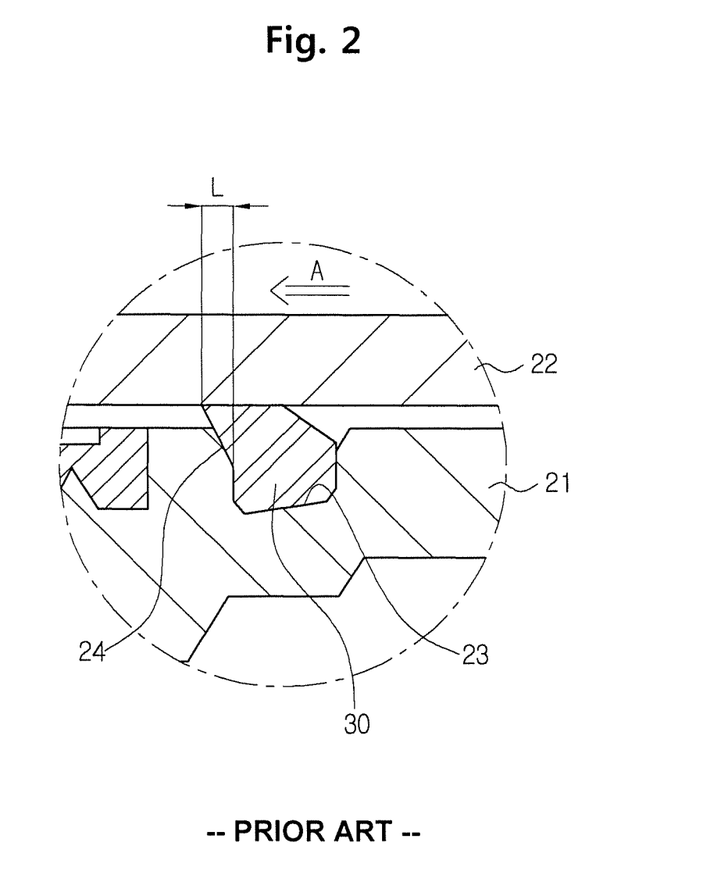
FIG. 2 is a partially enlarged view illustrating operation of the conventional electronic disc brake.

FIG. 1 is a cross-sectional view illustrating a conventional electronic disc brake, and FIG. 2 is a view illustrating operation of moving a piston backward using a sealing member and a roll-back chamfer.

As shown in FIGS. 1 and 2, an electronic disc brake 1 includes a pair of pad plates 11 to generate braking force by being pressed against a disc D, a carrier 10 to support the pair of pad plates 11, a caliper housing 20 installed at the carrier 10 and provided with a piston 22 slidably installed in a cylinder 21 to apply pressure to the pair of pad plates 11, a motor 50 to generate driving force, a spindle unit 40 to convert rotational force of the motor 50 into linear movement and apply pressure to the piston 22, and a sealing member 30 interposed between an inner surface of the cylinder 21 and an outer surface of the piston 22. The sealing member 30 serves to seal the space between the inner surface of the cylinder 21 and the outer surface of the piston 22 to prevent leakage of brake oil and to allow the piston 22 to be moved forward in the direction of arrow A, as shown in FIG. 2, for implementation of braking and moved back to an original position thereof by resilience of the sealing member 30, by which the sealing member 30 recovers an original shape thereof, when the braking operation is terminated.

The sealing member 30 is formed in a ring shape to be inserted into a circular roll-back chamfer 23 provided in the inner surface of the cylinder 21, and has a quadrilateral cross section. In addition, the roll-back chamfer 23 to accommodate the sealing member 30 is provided with a slope 24 at a side of the opening facing the direction opposite to the direction of braking (indicated by arrow A) to allow the sealing member 30 to be deformed when the piston 22 is moved forward in the direction of braking, as shown in FIG. 2.

When the piston 22 is moved forward to perform braking, the sealing member 30 is deformed as shown in FIG. 2. When the braking operation is terminated, the sealing member 30 returns in the direction opposite to arrow A to an original state thereof shown in FIG. 1. Accordingly, the piston 22 is moved back to an original position thereof by resilience of the sealing member 30. This action is referred to as roll-back. The return distance of the piston 22 depends on the deformed width L of the sealing member 30.

However, in the conventional electronic disc brake 1, since the side of the sealing member 30 facing the direction in which braking is performed is a flat surface roughly perpendicular to the outer surface of the piston 22 as shown in FIG. 1, the deformed width L of the sealing member 30 is limited as shown in FIG. 2, and thereby the return distance of the piston 22 may be short. That is, the deformation of the conventional sealing member 30 is small, and thus increasing the return distance of the piston 22 may be limited. If the return distance of the piston 22 is short, the friction pads 12 attached to the pad plates 11 may not be sufficiently separated from the disc D when the braking operation is terminated, resulting in wear of the friction pads 12. That is, the amount of roll-back given according to the machining allowance of the cylinder 21 and friction between the sealing member 30 and the piston 22 may result in high drag.

Further, in the case in which the spindle unit 40 applies pressure to the piston 22 to generate parking braking force, since braking force is first generated by hydraulic brake pressure and then parking braking force is applied by the spindle unit 40, slippage between the sealing member 30 and the piston 22 may occur higher than when braking force is generated by general hydraulic brake pressure. Thereby, the return distance of the piston 22 may be short, resulting in high drag.

Meanwhile, in the case of using a compression spring (not shown), the amount of roll-back may increase as the friction pad 12 wears, resulting in poor initial brake feeling. Further, excessive roll-back of the piston 22 may occur due to the compression spring, resulting in a sinking brake pedal.

SUMMARY

It is an aspect of the present invention to provide an electronic disc brake which is equipped with a low-pressure spring and a high-pressure spring to operate according to low pressure and high pressure when braking is performed, so as to prevent a drag phenomenon by enhancing the effect of return of a piston and to secure a gap between a disc and friction pads by forming a gap between the low-pressure spring and the high-pressure spring in the longitudinal direction.

It is another aspect of the present invention to provide an electronic disc brake which is equipped with an adjuster so as to improve brake feeling by preventing pad plates from moving away from a disc and maintaining a constant gap between the pad plates and the disc.

Additional aspects of the invention will be set forth in part in the description which follows and, in part, will be obvious from the description, or may be learned by practice of the invention.

In accordance with one aspect of the present invention, an electronic disc brake comprises: a carrier at which a pair of pad plates is installed to be moved forward and backward; a caliper housing slidably installed at the carrier and provided with a cylinder in which a piston is installed to be moved forward and backward by hydraulic brake pressure; an adjuster installed in the piston to prevent the pad plates from moving away from a disc and maintain the pad plates at a certain distance from the disc; a push rod installed in the cylinder and having a front portion screw-coupled to the adjuster and a rear portion formed with a flange extending toward an inner circumferential surface of the cylinder; a spindle unit coupled to the rear portion of the push rod to prevent rotation of the push rod and to apply pressure to the push rod by converting rotational force of a motor into linear movement; a spring case having one end fixed to the cylinder and forming a predetermined accommodation space between the inner circumferential surface of the cylinder and the push rod; a low-pressure spring and a high-pressure spring arranged in parallel in the spring case to apply elastic force to the push rod; and a support plate slidably installed in the cylinder and supporting one end of the high-pressure spring so that a gap is formed between the low-pressure spring and the high-pressure spring in a longitudinal direction.

The cylinder may be provided with a stepped portion therein to support a rear end of the flange, and the support plate may include a vertical portion arranged at a front of the flange to support the high-pressure spring and a horizontal portion bent from the vertical portion in an outward direction of the flange and supported by the stepped portion so that the vertical portion is spaced a certain distance apart from a leading end surface of the flange.

The spindle unit may include: a screw member having one end portion which penetrates the caliper housing to be rotatable and the other end portion which is formed with threads on an outer circumferential surface thereof and is disposed in the cylinder; and a nut member having a through-hole which is formed through the nut member in a longitudinal direction and is formed with threads to be screw-coupled to the screw member, and an extending portion which extends from an end portion of the nut member toward the inner circumferential surface of the cylinder. The nut member may be provided with plural rotation-prevention protrusions protruding outward and arranged equally spaced along an outer circumferential surface of the extending portion, the cylinder may be formed with rotation-prevention recesses corresponding to the rotation-prevention protrusions, and thereby the nut member may be moved forward and backward in the longitudinal direction of the screw member according to rotation of the screw member.

The extending portion of the nut member may be provided with pins protruding forward, and the flange may be formed with plural pin holes at positions corresponding to those of the pins, into which the pins are inserted to prevent rotation of the push rod.

The adjuster may include a head portion contacting the piston and a rod extending rearward from the head portion and provided with threads on an outer circumferential surface thereof to be screw-coupled to the push rod. Washers may be installed respectively at a rear wall of the head portion of the adjuster and an inner lateral surface of the piston, a washer spring may be arranged between the washers, and thereby the adjuster may be arranged to contact the piston by elastic force of the washer spring.

As is apparent from the above description, the electronic disc brake according to the embodiments of the present invention is provided with the low-pressure spring configured to operate according to low pressure and the high-pressure spring configured to operate according to high pressure in braking operation, and thus may not only prevent drag by moving the piston backward, but also secure a gap between the disc and the friction pads by forming a gap between the low-pressure spring and the high-pressure spring in the longitudinal direction. Accordingly, wear of the friction pads due to unnecessary friction between the friction pads and the disc and noise resulting therefrom may be prevented, and normal braking force may be ensured.

Moreover, initial brake feeling may be improved through elimination of increase in the amount of roll-back according to wear of the friction pads which are pressed against the disc.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the preferred embodiments of the present invention, examples of which are illustrated in the accompanying drawings. It should be understood that the terms used in the specification and appended claims should not be construed as limited to general and dictionary meanings but be construed based on the meanings and concepts according to the spirit of the present invention on the basis of the principle that the inventor is permitted to define appropriate terms for the best explanation. The preferred embodiments described in the specification and shown in the drawings are illustrative only and are not intended to represent all aspects of the invention, such that various equivalents and modifications can be made without departing from the spirit of the invention.

Figure 3:
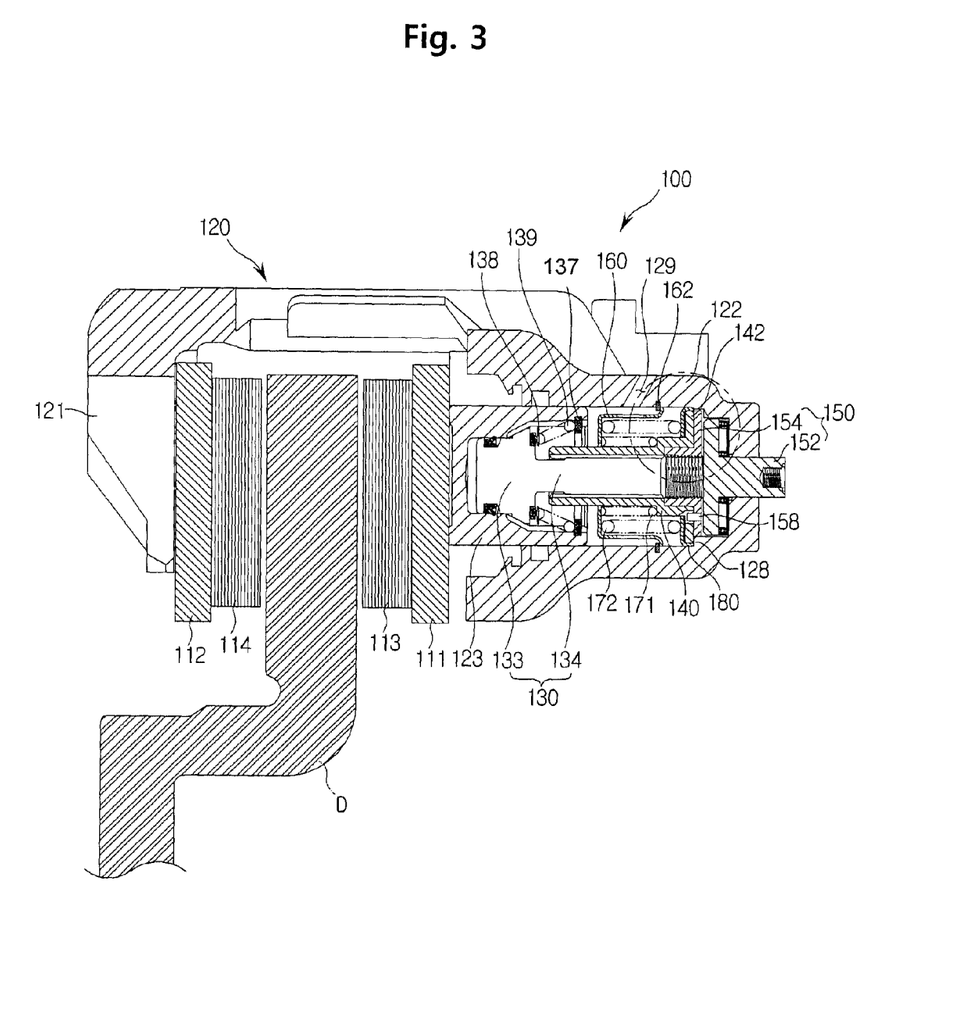
FIG. 3 is a cross-sectional view illustrating an electronic disc brake according to an exemplary embodiment of the present invention.
Figure 4:
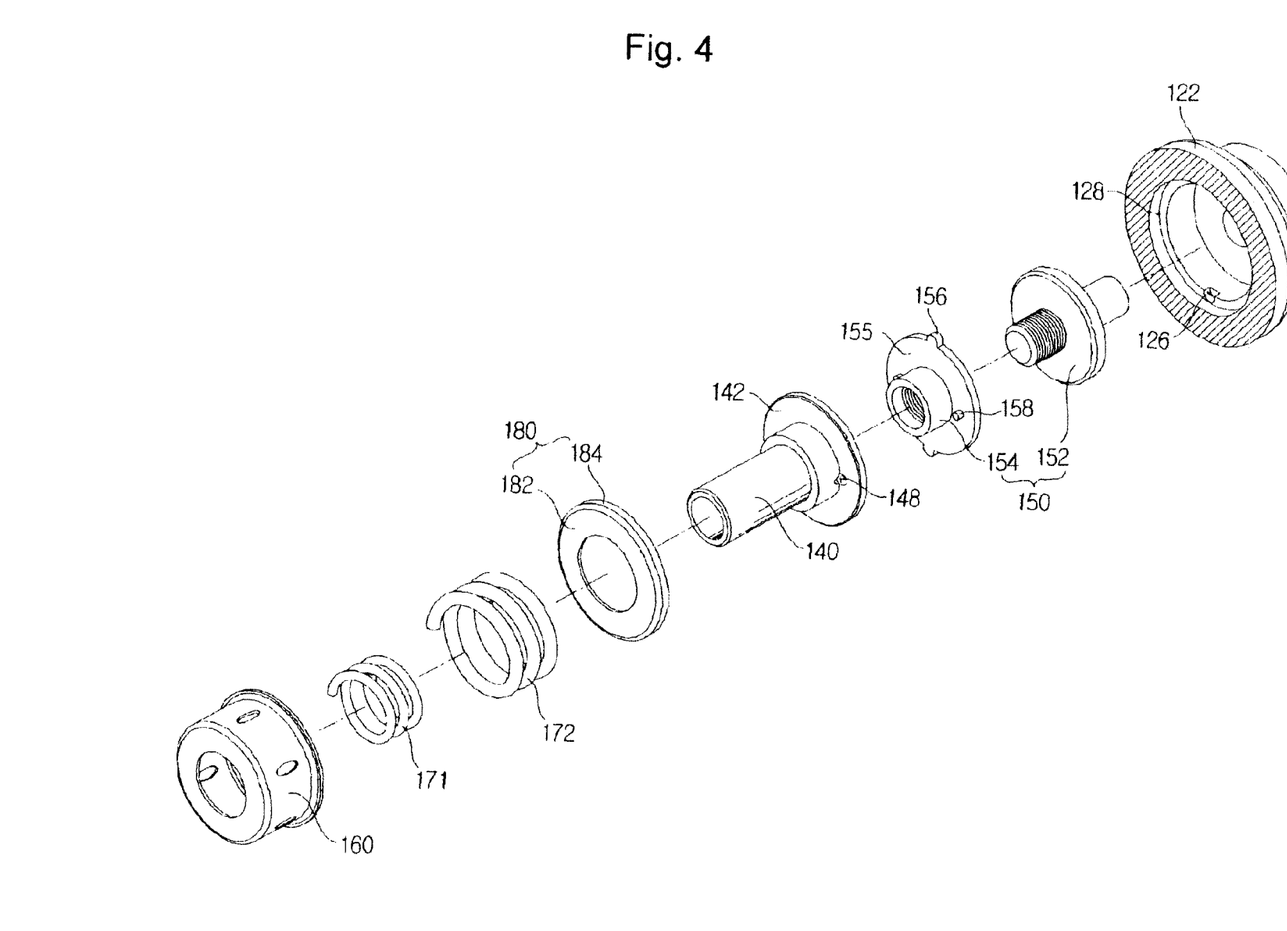
FIG. 4 is an exploded perspective view illustrating installation of a push rod, a low-pressure spring, a high-pressure spring and a spindle unit provided in the electronic disc brake according to an exemplary embodiment of the present invention.

FIG. 3 is a cross-sectional view illustrating an electronic disc brake according to an exemplary embodiment of the present invention, and FIG. 4 is an exploded perspective view illustrating installation of a push rod, a low-pressure spring, a high-pressure spring and a spindle unit provided in the electronic disc brake according to an exemplary embodiment of the present invention.

Referring to FIGS. 3 and 4, an electronic disc brake 100 includes a caliper housing 120 at which a piston 123 is installed to be moved forward and backward by hydraulic brake pressure, a carrier (not shown) fixed to a vehicle body and coupled with the caliper housing 120 to allow the caliper housing 120 to be slidable, a pair of pad plates 111 and 112 installed at the carrier to be spaced a certain distance apart from each other and slidable toward a disc D rotating together with a wheel (not shown) to be pressed against the disc D, an adjuster 130 to prevent the pad plates 111 and 112 from moving away from the disc D and maintain the pad plates 111 and 112 at a certain distance from the disc D, a push rod 140 screw-coupled to the adjuster 130, a spindle unit 150 coupled to the push rod 140 to prevent rotation of the push rod 140 and installed at a cylinder 122 of the caliper housing 120, a spring case 160 forming a predetermined accommodation space between an inner lateral surface of the cylinder 122 and the push rod 140, a low-pressure spring 171 and a high-pressure spring 172 arranged in parallel in the spring case 160, and a support plate 180 slidably installed in the cylinder 122 so that a gap is formed between the low-pressure spring 171 and the high-pressure spring 172 in the longitudinal direction.

The carrier (not shown) is fixed to a knuckle of a vehicle body through mounting bolts (not shown), and the caliper housing 120 is slidably coupled to both ends of the carrier through a guide rod (not shown). In addition, the pair of pad plates 111 and 112 are mounted at the center of the carrier to be spaced a certain distance apart from each other and slidable in the directions in which they face each other.

The pair of pad plates 111 and 112 are divided into an inner pad plate 111 disposed to contact the piston 123, which will be described below, and provided with a friction pad 113 attached to an inner side surface thereof, and an outer pad plate 112 disposed to contact a finger 121, which will be described below, and provided with a friction pad 114 attached to an inner side surface thereof. The disc D is formed in a shape of a circular plate rotating together with a wheel (not shown), and rotates with a portion thereof interposed between the pair of pad plates 111 and 112.

The caliper housing 120 includes the finger 121 to operate the outer pad plate 112 and the cylinder 122 in which the piston 123 is installed to be slidable by hydraulic brake pressure. The caliper housing 120 is provided with a hydraulic duct 129 at an end portion thereof, through which hydraulic brake pressure is transferred to the cylinder 122.

The finger 121 is formed to bend downward from the front portion of the caliper housing 120 to surround the outer pad plate 112 at the outside of the outer pad plate 112. Accordingly, when braking is applied, the caliper housing 120 slides rightward from the carrier by reaction force caused by movement of the piston 123, thereby causing the outer pad plate 112 to be pushed toward the disc D and pressed against the disc D by the finger 121.

The cylinder 122 is disposed at the rear of the caliper housing 120 to allow hydraulic brake pressure generated in a master cylinder (not shown) to be transferred, and the piston 123 is installed in the cylinder 122 to be movable forward and backward. That is, the piston 123 installed in the cylinder 122 is moved forward and backward within the cylinder 122 by hydraulic brake pressure. A stepped portion 128 is formed at the rear wall of the cylinder 122 to support a flange 142 of the push rod 140, which will be described later. The stepped portion 128 will be described below.

The piston 123 is formed in a cup shape having one opened side. A head portion 133 of the adjuster 130, which will be described later, is inserted into the inner central portion of the piston 123 to contact the piston 123.

The adjuster 130 includes a head portion 133 installed in the piston 123 inserted into the cylinder 122 to contact the piston 123, and a rod 134 extending from the head portion 133 and provided with threads on an outer circumferential surface thereof. As described above, the head portion 133 is inserted into the piston 123 through the opened portion of the piston 123 to contact the piston 123.

Such an adjuster 130, which serves to prevent the gap between the disc D and the pad plates 111 and 112 from expanding as the friction pads 113 and 114 attached to the pad plates 111 and 112 wear and to maintain a constant distance therebetween, has washers 137 and 138 installed respectively at the inner lateral surface of the piston 123 and the rear wall of the head portion 133 and a washer spring 139 arranged between the washers 137 and 138. That is, the adjuster 130 is arranged to contact the piston 123 by elastic force of the washer spring 139 installed between the inner lateral surface of the piston 123 and the head portion 133. Therefore, as the washer spring 139 presses the adjuster 130 toward the leading end of the piston 123, the adjuster 130 is kept in contact with the piston 123 even when the friction pads 113 and 114 of the pad plates 111 and 112 are worn out due to friction with the disc D to cause the position of the piston 123 to be shifted toward the inner pad plate 111.

The push rod 140 installed in the cylinder 122 is screw-coupled to the rear side of the adjuster 130, i.e., the rod 134. Thereby, when the piston 123 is moved forward by hydraulic brake pressure, the adjuster 130 coupled with the piston 123 is moved forward together with the piston 123, and the push rod 140 screw-coupled to the adjuster 130 is also moved forward. Thereby, the distance between the threads of the adjuster 130 and the push rod 140 screw-coupled to each other decreases. That is, a gap that is generally present between the threads of the adjuster 130 and the push rod 140 is reduced as the adjuster 130 is arranged to be pressed in the direction of forward movement of the piston 123 (leftward), and thereby the adjuster 130 and the push rod 140 simultaneously move.

The push rod 140 is formed to have a hollow core and threads provided on the inner circumferential surface thereof to be screw-coupled to the adjuster 130. In addition, a flange 142 extending toward the inner circumferential surface of the cylinder 122 is provided at the rear portion of the push rod 140. The flange 142 of the push rod 140 is coupled to a nut member 154 of the spindle unit 150, which will be described later, and thereby is prevented from rotating. The rotation-prevention structure of the push rod 140 will be described below.

As the push rod 140 is screw-coupled to the adjuster 130 and rotation thereof is prevented, the adjuster 130 is movable in the longitudinal direction of the push rod 140. That is, when the piston 123 moves due to wear of the friction pads 113 and 114, the adjuster 130, which is caused to closely contact the piston 123 by the washer spring 139, rotates to move from the push rod 140 by the traveling distance of the piston 123 to remain in close contact with the piston 123. Thereby, the distance between the disc D and the pad plates 111 and 112 to which pressure is applied by the piston 123 is kept constant.

Meanwhile, the flange 142 of the push rod 140 is formed with plural pin holes 148 along the outer circumferential surface thereof, into which pins 158 provided at the nut member 154 of the spindle unit 150 are inserted. The pin holes 148 are formed at the positions corresponding to those of the pins 158. Thereby, the push rod 140 is coupled to the spindle unit 150 and rotation of push rod 140 is prevented through insertion of the pins 158 into the pin holes 148.

The push rod 140 is arranged such that the rear end of the flange 142 contacts the stepped portion 128 to be supported by the stepped portion 128. As shown in FIGS. 3 and 4, the spindle unit 150 is arranged at the rear of the push rod 140, i.e., the rear portion of the caliper housing 120 which is a position farther rearward than the stepped portion 128.

The spindle unit 150 is installed at the rear of the push rod 140, and acts to prevent rotation of the push rod 140 and apply pressure to the push rod 140 by receiving rotational force from a motor (not shown) and converting the rotational force into linear movement. The spindle unit 150 includes a screw member 152 having threads on the outer circumferential surface thereof and a nut member 154 having threads on the inner circumferential surface thereof to be screw-coupled to the screw member 152.

The screw member 152 has one end portion which penetrates the rear portion of the caliper housing 120 to be rotatable and the other end portion which is formed with threads on the outer circumferential surface thereof and is disposed in the cylinder 122. The end portion of the screw member 152 penetrating the caliper housing 120 is coupled to a rotating shaft of a reduction gear unit (not shown) and receives rotational force of the motor.

The nut member 154 has a through-hole formed through the center portion of the nut member 154 in the longitudinal direction so as to be screw-coupled to the screw member 152, and the through-hole is formed with threads. The nut member 154 further has an extending portion 155 extending from an end portion of the nut member 154 toward the inner circumferential surface of the cylinder 122. The nut member 154 is restricted in rotation so as to move linearly according to rotation of the screw member 152. As shown in the drawings, the nut member 154 is provided with plural rotation-prevention protrusions 156 protruding outward and arranged equally spaced along the outer circumferential surface of the extending portion 155. The cylinder 122 is formed with rotation-prevention recesses 126 on the inner circumferential surface thereof, and the rotation-prevention recesses 126 are formed at the positions corresponding to those of the rotation-prevention protrusions 156. That is, due to insertion of the rotation-prevention protrusions 156 into the rotation-prevention recesses 126, the nut member 154 is prevented from rotating and moves in the longitudinal direction of the screw member 152 according to a rotating direction of the screw member 152.

The pins 158 are fixed to the extending portion 155 and protrude forward. As described above, the pins 158, which act to restrict rotation of the push rod 140, are inserted into the pin holes 148 formed at the flange 142. As the nut member 154 presses the push rod 140 while moving linearly, the nut member 154 comes into contact with the flange 142 of the push rod 140.

The spring case 160 is arranged to form a predetermined accommodation space between the push rod 140 and the inner lateral surface of the cylinder 122. Specifically, one end of the spring case 160 is fixed to the inner lateral surface of the cylinder 122 by a snap ring 162. The low-pressure spring 171 and the high-pressure spring 172 to return the piston 123 by returning the push rod 140 and the support plate 180 to original positions thereof are provided in the spring case 160. The low-pressure spring 171 and the high-pressure spring 172 are arranged in parallel, and the support plate 180 is interposed between the high-pressure spring 172 and the flange 142.

One end of the low-pressure spring 171 is supported by the flange 142 and the other end thereof is supported by the other lateral surface of the spring case 160. The flange 142 is formed in a stepped shape to stably support the low-pressure spring 171. The high-pressure spring 172 is spaced a certain distance apart from the low-pressure spring 171. One end of the high-pressure spring 172 is supported by the support plate 180 and the other end thereof is supported by the other lateral surface of the spring case 160.

Figure 5:
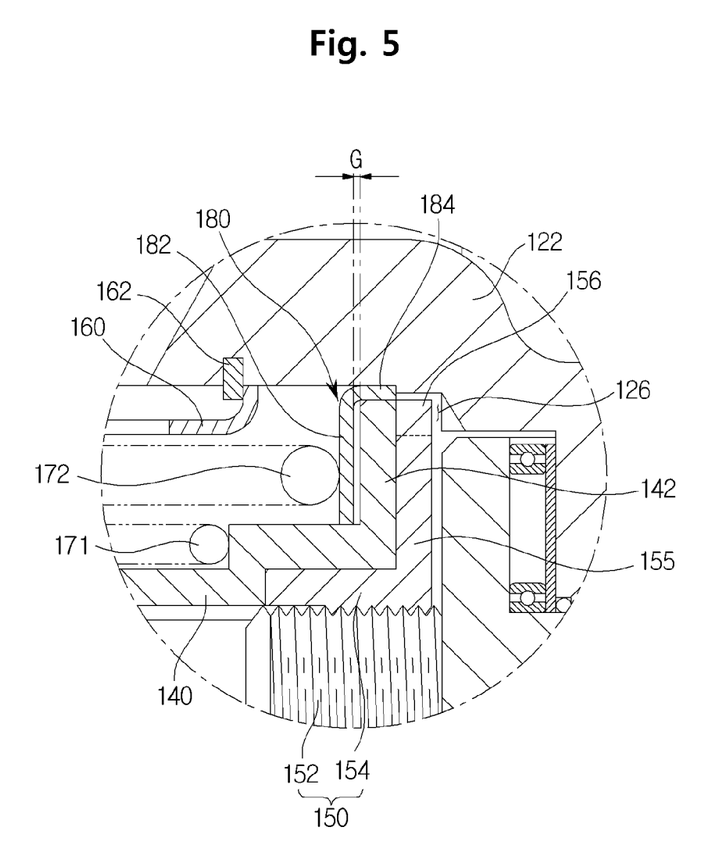
FIG. 5 is a partially enlarged view illustrating a gap formed between a push rod and a support plate provided in the electronic disc brake according to an exemplary embodiment of the present invention.

The support plate 180 is slidably installed in the cylinder 122 so that a gap is formed between the low-pressure spring 171 and the high-pressure spring 172 in the longitudinal direction. More specifically, the support plate 180 includes a vertical portion 182 which is arranged at the front of the flange 142 to support one end of the high-pressure spring 172, and a horizontal portion 184 which is bent from the vertical portion 182 in the outward direction of the flange 142 so that the vertical portion 182 is spaced a certain distance apart from the leading end surface of the flange 142. That is, the horizontal portion 184 is bent to surround the outer lateral surface of the flange 142 and is supported by the stepped portion 128 of the cylinder 122. The length of the horizontal portion 184 is greater than the thickness of the flange 142. As shown in FIG. 5, a certain gap G is formed between the leading end surface of the flange 142 and the vertical portion 182 of the support plate 180. Thereby, a gap between the disc D and the pad plates 111 and 112 is secured.

Figure 6:
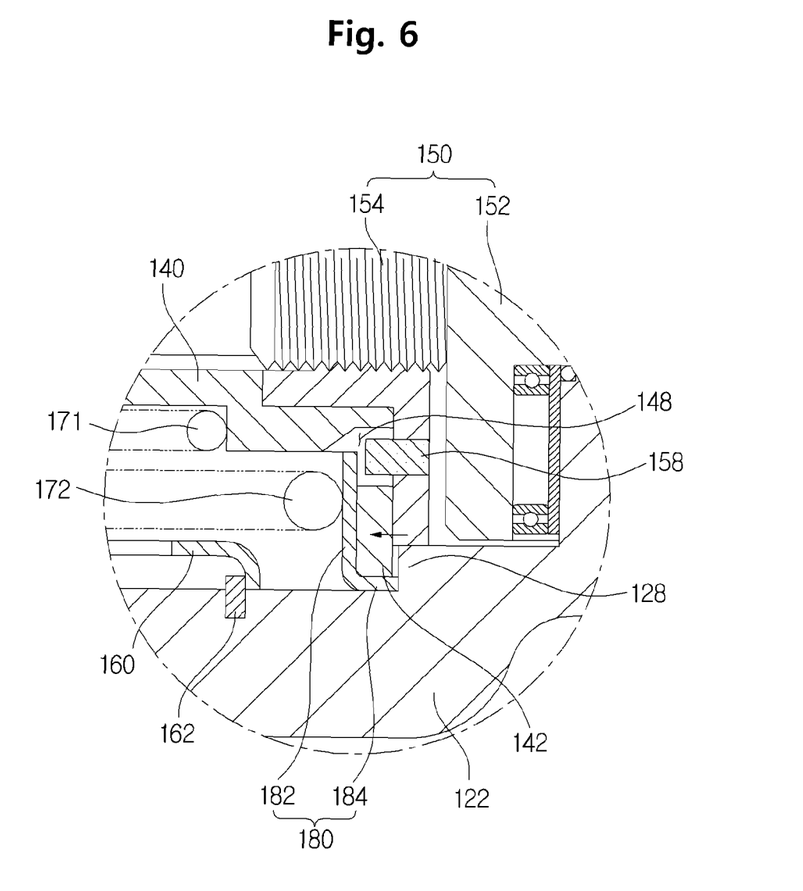
FIGS. 6 and 7 are views illustrating operation of the electronic disc brake according to an exemplary embodiment of the present invention.
Figure 7:
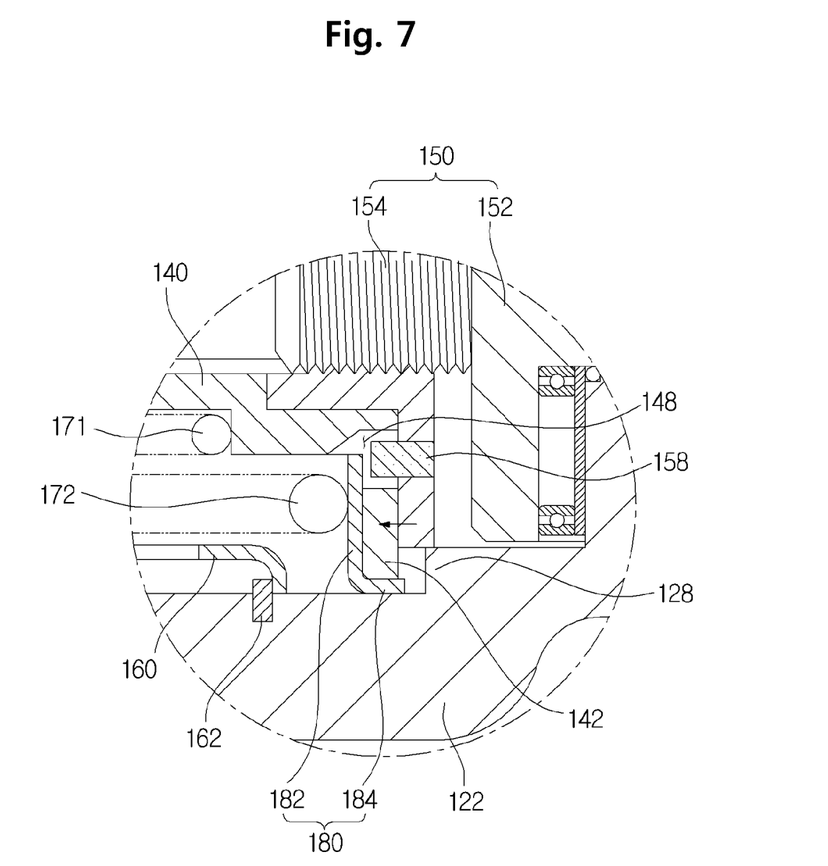

As the structure to support the low-pressure spring 171 and the high-pressure spring 172 is provided as above, the low-pressure spring 171 is supported by the flange 142 and the high-pressure spring 172 is supported by the support plate 180 when the electronic disc brake 100 does not operate. When the brake is applied and the nut member 154 presses the push rod 140 by receiving rotational force from the motor (not shown), the low-pressure spring 171 supported by the flange 142 of the push rod 140 is first compressed as shown in FIG. 6. As the low-pressure spring 171 is compressed by a distance beyond the size of the gap G between the flange 142 and the support plate 180, the flange 142 contacts the support plate 180 and the push rod 140 and the support plate 180 move together as shown in FIG. 7. That is, the support plate 180 supports the high-pressure spring 172, and thereby both the low-pressure spring 171 and the high-pressure spring 172 are compressed.

Operation of the electronic disc brake 100 as above will now be described. The electronic disc brake 100 may generate parking braking force by the spindle unit 150 or generate braking force by hydraulic brake pressure. Hereinafter, the state in which parking braking force is generated by the spindle unit 150 and the state in which braking force is generated by hydraulic brake pressure will be explained respectively.

First, the operational state in which parking braking force is generated by the spindle unit 150 will be explained. When the electronic disc brake 100 according to the present invention is installed at a vehicle, the gap G is formed between the flange 142 of the push rod 140 and the vertical portion 182 of the support plate 180, and thereby a gap between the disc D and the and the pad plates 111 and 112 is secured.

When the screw member 152 is rotated by receiving rotational force from the motor (not shown) in this state, the nut member 154 screw-coupled to the screw member 152 moves in the longitudinal direction of the screw member 152 and applies pressure to the push rod 140. At this time, the nut member 154 is prevented from rotating through insertion of the rotation-prevention protrusions 156 into the rotation-prevention recesses 126, and moves while being guided by the cylinder 122.

More specifically, only the low-pressure spring 171 supported by the flange 142 is compressed by movement of the push rod 140. That is, as shown in FIG. 6, the push rod 140 moves a distance corresponding to the gap (see 'G' in FIG. 5) between the push rod 140 and the support plate 180, and compresses the low-pressure spring 171. Further, when the push rod 140 moves by a distance beyond the size of the gap G, the flange 142 contacts the vertical portion 182 of the support plate 180, and the push rod 140 and the support plate 180 move together (refer to FIG. 7). That is, both the low-pressure spring 171 and the high-pressure spring 172 are compressed. Accordingly, the adjuster 130 coupled to the push rod 140 and the piston 123 contacting the adjuster 130 move together to apply pressure to the inner pad plate 111, thereby generating parking braking force.

When the braking operation is terminated, if the screw member 152 rotates reversely to the direction of rotation when the brake is applied, the push rod 140 and the support plate 180 are returned to original positions thereof by the high-pressure spring 172 and the low-pressure spring 171. Thereby, the piston 123 is smoothly moved backward without suffering drag.

Next, the operational state in which the piston 123 is pressed by hydraulic brake pressure to generate braking force will be explained. As hydraulic brake pressure is introduced into the cylinder 122, causing the piston 123 to apply pressure to the inner pad plate 111, the friction pad 113 attached to the inner pad plate 111 is pressed against the disc D. At the same time, the caliper housing 120 slides from the carrier (not shown) according to reaction force, and thereby the finger 121 applies pressure to the outer pad plate 112, causing the friction pad 114 attached to the outer pad plate 112 to be pressed against the disc D to generate braking force.

As the piston 123 moves, the adjuster 130 contacting the piston 123 and the push rod 140 coupled to the adjuster 130 move together. At this time, when the push rod 140 moves together with the piston 123 by hydraulic brake pressure, the screw member 152 and the nut member 154 are kept in a fixed state and thus do not move. The push rod 140 moves without rotating by insertion of the pins 158 of the nut member 154 into the pin holes 148 of the flange 142.

When the piston 123 is pressed by hydraulic brake pressure, similar to the operational state of being pressed by the spindle unit 150, the push rod 140 moves a distance corresponding to the gap G between the push rod 140 and the support plate 180 and compresses only the low-pressure spring 171. Further, when the flange 142 contacts the support plate 180, the push rod 140 and the support plate 180 move together, and thereby both the low-pressure spring 171 and the high-pressure spring 172 are compressed.

After braking is completed, the push rod 140 and the support plate 180 are returned to original positions thereof by the high-pressure spring 172 and the low-pressure spring 171, and thereby the piston 123 is smoothly moved backward without suffering drag.

As described above, since the low-pressure spring 171 and the high-pressure spring 172 are respectively provided and supported by the push rod 140 and the support plate 180 and the gap G between the push rod 140 and the support plate 180 is secured, the braking operation is performed according to a low-pressure condition or a high-pressure condition. That is, in the case of a low-pressure condition, the push rod 140 only moves a distance corresponding to the gap G, and in the case of a high-pressure condition, the push rod 140 and the support plate 180 move together.

After braking is completed, once the support plate 180 is caused to contact the stepped portion 128 of the cylinder 122 by the high-pressure spring 172, the low-pressure spring 171 finally moves the push rod 140 by a distance corresponding to the gap G to return the push rod 140 to an original position thereof. In addition, since the adjuster 130 screw-coupled to the push rod 140 and the piston 123 return to original positions thereof, the effect of return of the piston 123 is enhanced. Thereby, the initial gap between the disc D and the friction pads 113 and 114 is maintained.

When the friction pads 113 and 114 wear out due to braking, the gap between the disc D and the pad plates 111 and 112, i.e., the gap between the disc D and the friction pads 113 and 114 is automatically adjusted by the adjuster 130.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic disc brake including a carrier at which a pair of pad plates move forward and backward, and a caliper housing slidably installed at the carrier and provided with a cylinder in which a piston moves forward and backward by hydraulic brake pressure, the electronic disc brake comprising:
    an adjuster installed in the piston to prevent the pair of pad plates from moving away from a disc and to maintain the pair of pad plates at a certain distance from the disc;
    a push rod installed in the cylinder and having a front portion screw-coupled to the adjuster and a rear portion formed with a flange extending toward an inner circumferential surface of the cylinder;
    a spindle unit coupled to the rear portion of the push rod to prevent rotation of the push rod and to apply pressure to the push rod by converting rotational force of a motor into linear movement, a front portion of the spindle unit is in surface contact with a rear portion of the adjuster;
    a spring case having one end fixed to the cylinder and forming a predetermined accommodation space between the inner circumferential surface of the cylinder and the push rod;
    a low-pressure spring and a high-pressure spring arranged in parallel in the accommodation space of the spring case to apply elastic force to the push rod; and
    a support plate slidably installed in the cylinder and supporting one end of the high-pressure spring so that a gap is formed between the low-pressure spring and the high-pressure spring in a longitudinal direction,
    wherein the high-pressure spring extends further rearward to be outside the spring case.

2. The electronic disc brake according to claim 1, wherein the cylinder is provided with a stepped portion therein to support a rear end of the flange, and
    the support plate includes a vertical portion arranged at a front of the flange to support the high-pressure spring and a horizontal portion bent from the vertical portion in an outward direction of the flange and supported by the stepped portion so that the vertical portion is spaced a certain distance apart from a leading end surface of the flange.

3. The electronic disc brake according to claim 1, wherein the spindle unit includes:
    a screw member having one end portion which penetrates the caliper housing to be rotatable and the other end portion which is formed with threads on an outer circumferential surface thereof and is disposed in the cylinder; and
    a nut member having a through-hole which is formed through the nut member in a longitudinal direction and is formed with threads to be screw-coupled to the screw member, and an extending portion which extends from an end portion of the nut member toward the inner circumferential surface of the cylinder,
    and wherein the nut member is provided with plural rotation-prevention protrusions protruding outward and arranged equally spaced along an outer circumferential surface of the extending portion, the cylinder is formed with rotation-prevention recesses corresponding to the rotation-prevention protrusions, and thereby the nut member is moved forward and backward in the longitudinal direction of the screw member according to rotation of the screw member.

4. The electronic disc brake according to claim 3, wherein the extending portion of the nut member is provided with pins protruding forward, and the flange is formed with plural pin holes at positions corresponding to those of the pins, into which the pins are inserted to prevent rotation of the push rod.

5. The electronic disc brake according to claim 1, wherein the adjuster includes a head portion contacting the piston and a rod extending rearward from the head portion and provided with threads on an outer circumferential surface thereof to be screw-coupled to the push rod, and wherein washers are installed respectively at a rear wall of the head portion of the adjuster and an inner lateral surface of the piston, a washer spring is arranged between the washers, and thereby the adjuster is arranged to contact the piston by elastic force of the washer spring.

6. The electronic disc brake according to claim 1, wherein the spring case has one end fixed to an inner lateral surface of the cylinder by a snap ring.

7. An electronic disc brake including a carrier at which a pair of pad plates move forward and backward, and a caliper housing slidably installed at the carrier and provided with a cylinder in which a piston moves forward and backward by hydraulic brake pressure, the electronic disc brake comprising:

an adjuster installed in the piston to prevent the pair of pad plates from moving away from a disc and to maintain the pair of pad plates at a certain distance from the disc;

a push rod installed in the cylinder and having a front portion screw-coupled to the adjuster and a rear portion formed with a flange extending toward an inner circumferential surface of the cylinder;

a spindle unit coupled to the rear portion of the push rod to prevent rotation of the push rod and to apply pressure to the push rod by converting rotational force of a motor into linear movement;

a spring case having one end fixed to the cylinder and forming a predetermined accommodation space between the inner circumferential surface of the cylinder and the push rod;

a low-pressure spring and a high-pressure spring arranged in parallel in the accommodation space of the spring case to apply elastic force to the push rod; and a support plate slidably installed in the cylinder and supporting one end of the high-pressure spring so that a gap is formed between the low-pressure spring and the high-pressure spring in a longitudinal direction, wherein the cylinder is provided with a stepped portion therein to support a rear end of the flange, and the support plate includes a vertical portion arranged at a front of the flange to support the high-pressure spring and a horizontal portion bent from the vertical portion in an outward direction of the flange and supported by the stepped portion so that the vertical portion is spaced a certain distance apart from a leading end surface of the flange.

* * * * *